United States Patent
Wu

(10) Patent No.: US 7,866,865 B2
(45) Date of Patent: Jan. 11, 2011

(54) TAIL LIGHT

(75) Inventor: Chia-Ying Wu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 164 days.

(21) Appl. No.: 12/251,728

(22) Filed: Oct. 15, 2008

(65) Prior Publication Data
US 2009/0251909 A1  Oct. 8, 2009

(30) Foreign Application Priority Data
Apr. 8, 2008 (CN) .......................... 2008 1 0300864

(51) Int. Cl.
*B60Q 1/26* (2006.01)
*F21V 21/00* (2006.01)
*B60Q 1/02* (2006.01)

(52) U.S. Cl. .................. 362/541; 362/545; 315/77; 315/82

(58) Field of Classification Search ............... 362/487, 362/497, 498, 499, 540, 541, 542, 543, 545; 315/77, 82, 83
See application file for complete search history.

(56) References Cited

U.S. PATENT DOCUMENTS

| | | | | |
|---|---|---|---|---|
| 4,556,862 A | * | 12/1985 | Meinershagen | 340/478 |
| 4,868,719 A | * | 9/1989 | Kouchi et al. | 362/545 |
| 6,657,393 B2 | * | 12/2003 | Natsume | 315/82 |
| 6,867,692 B2 | * | 3/2005 | Weatherspoon | 340/479 |
| 7,002,458 B2 | * | 2/2006 | Su | 340/465 |
| 7,040,790 B2 | * | 5/2006 | Lodhie et al. | 362/541 |
| 7,575,349 B2 | * | 8/2009 | Bucher et al. | 362/503 |
| 2006/0262553 A1 | * | 11/2006 | Bogos | 362/541 |

* cited by examiner

*Primary Examiner*—John A Ward
(74) *Attorney, Agent, or Firm*—Andrew C. Cheng

(57) ABSTRACT

A tail light for an automobile includes a plurality of first illuminating elements and a plurality of second illuminating elements. The first illuminating elements are arranged to form a logo pattern of the automobile, and each of the first and second illuminating elements are configured for providing an adjustable illuminating brightness. The tail light is capable of selectively operating between a braking state and a non-braking state. In the braking state, the illuminating brightness of the first illuminating elements is greater than that of the second illuminating elements. In the non-braking state, the illuminating brightness of the first illuminating elements is less than that of the second illuminating elements.

5 Claims, 2 Drawing Sheets

TAIL LIGHT

BACKGROUND

1. Field of the Invention

The present invention generally relates to tail lights, and particularly to a tail light capable of being customized and individualized.

2. Description of Related Art

With development of the automobile industry, performance, aerodynamics and overall appearance of automobiles have been designed to meet desires of consumers. Lamps used in automobiles, such as tail lights, are usually one of the important exterior part in embellishing the automobiles.

However, most conventional tail lights are dull, and lack of characters and personalization, thus can not meet the desires.

What is needed, therefore, is an improved tail light which can overcome the above shortcomings.

SUMMARY

A tail light for an automobile includes a plurality of first illuminating elements and a plurality of second illuminating elements. The first illuminating elements are arranged to form a logo pattern of the automobile, and each of the first and second illuminating elements are configured for providing an adjustable illuminating brightness. The tail light is capable of selectively operating between a braking state and a non-braking state. In the braking state, the illuminating brightness of the first illuminating elements is greater than that of the second illuminating elements. In the non-braking state, the illuminating brightness of the first illuminating elements is less than that of the second illuminating elements.

Other advantages and novel features of the present tail light will become more apparent from the following detailed description when taken in conjunction with the accompanying drawings.

BRIEF DESCRIPTION OF THE DRAWINGS

Many aspects of the present tail light can be better understood with reference to the following drawings. The components in the drawings are not necessarily drawn to scale, the emphasis instead being placed upon clearly illustrating the principles of the present tail light. Moreover, in the drawings, like reference numerals designate corresponding parts throughout the several views.

DETAILED DESCRIPTION OF EMBODIMENTS

Figure 1:
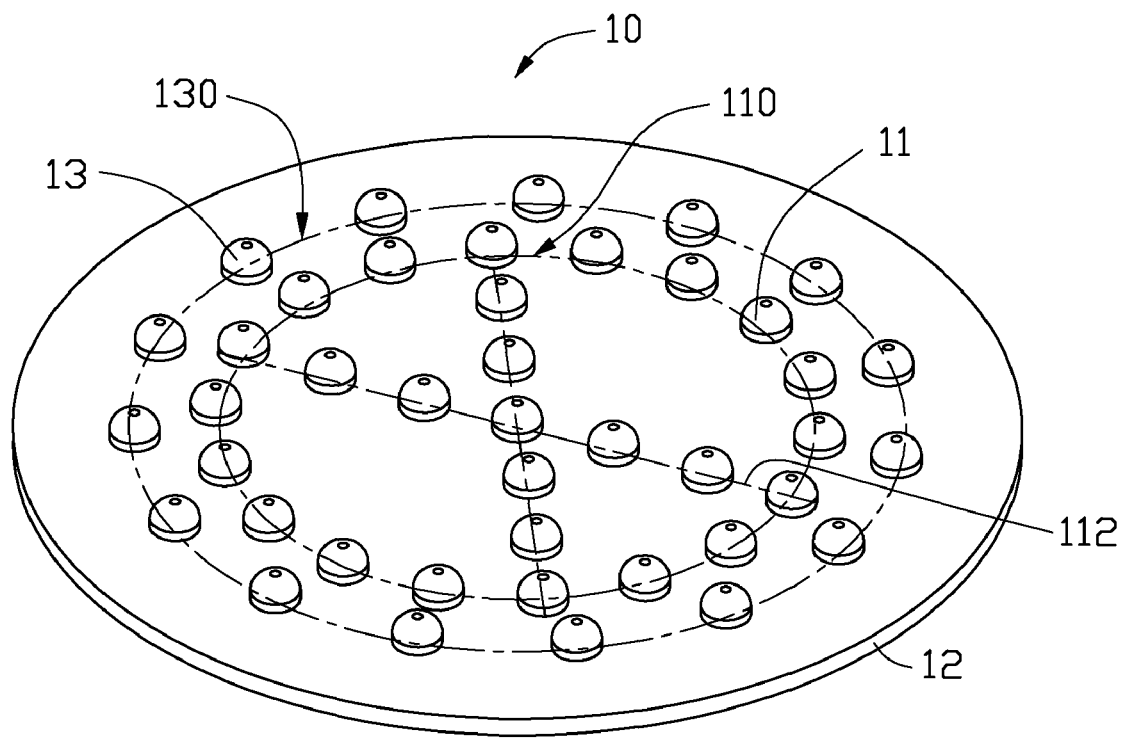
FIG. 1 is a schematic view of a tail light, in accordance with an exemplary embodiment.

Referring to FIG. 1, a tail light 10, in accordance with an exemplary embodiment, is shown. The tail light 10 can be installed on a vehicle, for example, an automobile. The tail light 10 includes a plurality of first illuminating elements 11 and a plurality of second illuminating elements 13.

The first illuminating elements 11 are arranged to form a logo pattern of the automobile. In the illustrated embodiment, the logo pattern includes a first circle 110, as well as two intersecting line segments 112, as shown in FIG. 1. The second illuminating elements 13 are arranged to form a second circle 130, which surrounds the first circle 110. The first and second illuminating elements 11, 13 can be light emitting diodes (LEDs) with high illuminating efficiency and small volume. The first and second illuminating elements 11, 13 can also be other illuminating elements, such as halogen illuminating elements and high pressure discharge illuminating elements, etc. In the exemplary embodiment, the first and second illuminating elements are LEDs. In addition, the first and second illuminating elements 11, 13 are mounted on a circuit board 12, such as a printed circuit board.

Figure 2:
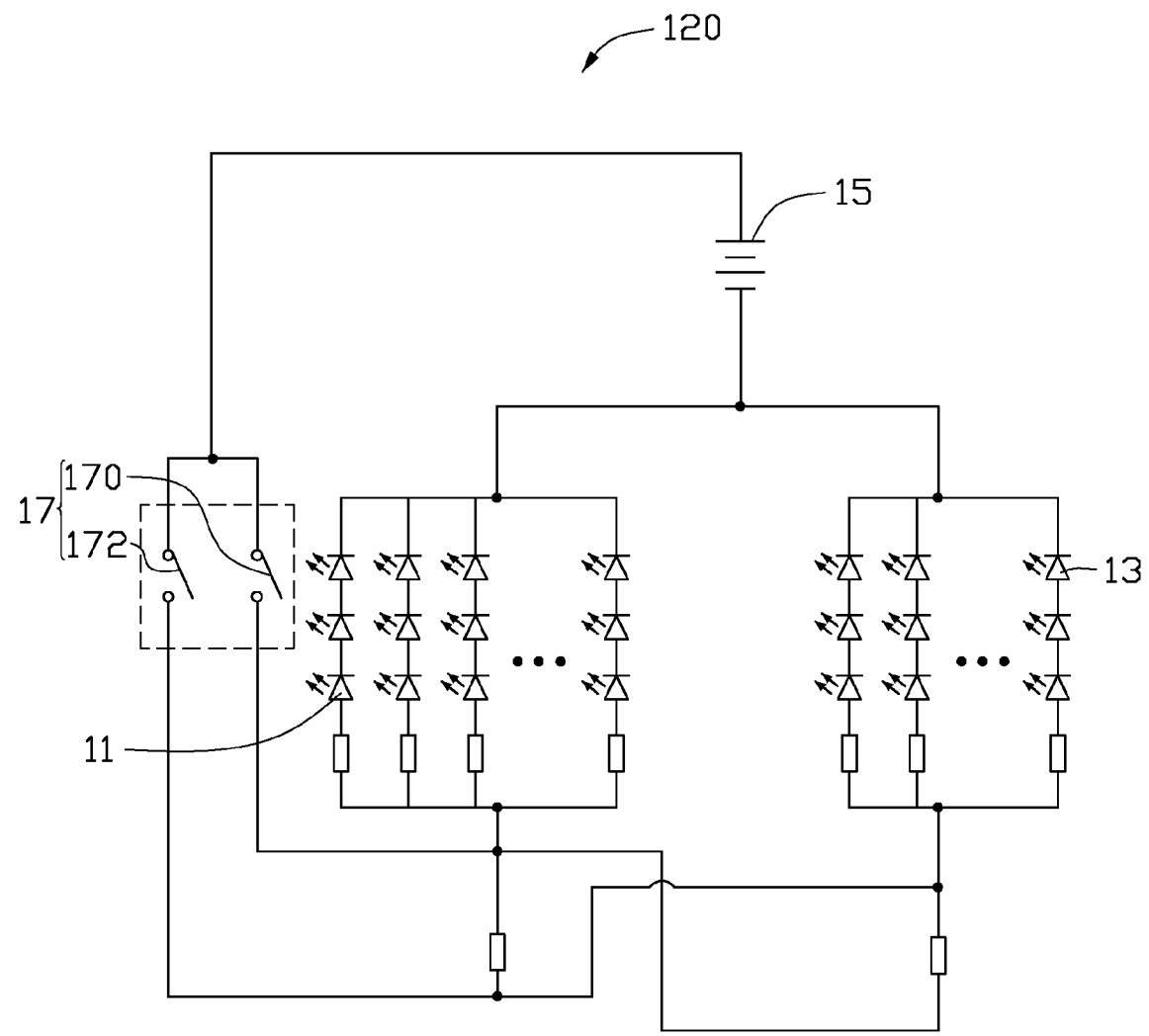
FIG. 2 is a schematic view of circuit connection of the tail light in FIG. 1.

Referring to FIGS. 1 and 2, the circuit board 12 has an electric circuit 120 formed thereon. The electric circuit 120 includes a power supply 15 and a switch 17. The switch 17 includes a braking switch 170 and a non-braking switch 172 and is configured for switching the first and second illuminating elements 11, 13 to operate between a braking state and a non-braking state, for example, a starting state. The sum total illuminating brightness of the first and second illuminating elements 11, 13 in the braking state is higher than that of the first and second illuminating elements 11, 13 in the non-braking state. Thus, the braking state and the non-braking state of the automobile can be distinguished from the sum total illuminating brightness of the first and second illuminating elements 11, 13.

Referring to FIG. 2, in the electric circuit 120, the first illuminating elements 11 are divided into a plurality of first light emitting diode groups. Each of the first light emitting diode groups has a resistor connected therewith. The first light emitting diode groups are connected in parallel, and the light emitting diodes of each first light emitting diode group are connected in series. Similarly, the second illuminating elements 13 are divided into a plurality of second light emitting diode groups. Each of the second light emitting diode group has a resistor connected therewith. The second light emitting diode groups are connected in parallel, and the light emitting diodes of each second diode group are connected in series.

The first and second illuminating elements 11, 13 are electrically connected to the power supply 15 through the switch 17. When the braking switch 170 is switched on, the sum total illuminating brightness of the first and second illuminating elements 11, 13 indicates that the automobile is in the braking state. And when the non-braking switch 172 is switched on, the sum total illuminating brightness of the first and second illuminating elements 11, 13 is adjusted to indicate that the automobile is in the non-braking state.

The arrangement of the first illuminating elements 11 can be customized to form any desired icon pattern, to show individualization. In addition, the illuminating brightness of first illuminating elements 11 can be adjusted to be higher than that of the second illuminating elements 13 in the braking state, thus the logo pattern of the automobile is apparent. Moreover, the illuminating brightness of first illuminating elements 11 can be adjusted to be less than that of the second illuminating elements 13 in the non-braking state. In such that, the illuminating brightness of first illuminating elements 11 operates between the braking state and the non-braking state, attracting more attention.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary preferred embodiments of the invention.

What is claimed is:

1. A tail light for an automobile, comprising a plurality of first illuminating elements and a plurality of second illuminating elements, the first illuminating elements arranged to form a logo pattern of the automobile, each of the first and second illuminating elements being configured for providing an adjustable illuminating brightness, wherein the tail light is selectively operated between a braking state where all of the first and second illuminating elements are powered and the illuminating brightness of the first illuminating elements is adjusted to be greater than that of the second illuminating elements, and a non-braking state where all of the first and second illuminating elements are powered and the illuminating brightness of the first illuminating elements is adjusted to be less than that of the second illuminating elements.

2. The tail light of claim 1, wherein the first and second illuminating elements include light emitting diodes.

3. The tail light of claim 1, wherein the sum total brightness of the first and second illuminating elements in the braking state higher than that of the first and second illuminating elements in the non-braking state.

4. The tail light of claim 1, further comprising a switch electrically connected to the first and second illuminating elements, for switching the first and second illuminating elements to operate between the braking state and the non-braking state.

5. The tail light of claim 1, wherein the second illuminating elements surround the first illuminating elements therein.

* * * * *